US012755005B2

(12) United States Patent
Djeyassilane et al.

(10) Patent No.: US 12,755,005 B2
(45) Date of Patent: Oct. 6, 2026

(54) BLOCKCHAIN-BASED THREAT INTELLIGENCE

(71) Applicant: American Express Travel Related Services Company, Inc., New York, NY (US)

(72) Inventors: Shankar Djeyassilane, Markham (CA); Hiranmayi Palanki, Tampa, FL (US)

(73) Assignee: American Express Travel Related Services Company, Inc., New York, NY (US)

( * ) Notice: Subject to any disclaimer, the term of this patent is extended or adjusted under 35 U.S.C. 154(b) by 241 days.

(21) Appl. No.: 18/329,875

(22) Filed: Jun. 6, 2023

(65) Prior Publication Data

US 2024/0411866 A1 Dec. 12, 2024

(51) Int. Cl.
*G06F 21/55* (2013.01)

(52) U.S. Cl.
CPC ...... *G06F 21/552* (2013.01); *G06F 2221/034* (2013.01)

(58) Field of Classification Search
CPC ......................... G06F 21/552; G06F 2221/034
See application file for complete search history.

(56) References Cited

U.S. PATENT DOCUMENTS

2021/0081366 A1* 3/2021 Madisetti .............. G06F 40/289
2024/0022584 A1* 1/2024 Kravitz ................. H04L 9/0891

FOREIGN PATENT DOCUMENTS

CN 108306893 B * 8/2021 ............. H04L 67/56
WO WO-2023063392 A1 * 4/2023 ............. G06F 21/64

OTHER PUBLICATIONS

Soma Prathibha • V Saiganesh • S Lokesh; Survey on Prevention of DDoS Using Blockchain; 2023 5th International Conference on Inventive Research in Computing Applications (ICIRCA) (2023, pp. 1246-1253); (Year: 2023).*

Qi Xia • Emmanuel Boateng Sifah • Kwame Omono Asamoah • Jianbin Gao • Xiaojiang Du • Mohsen Guizani; MeDShare: Trust-Less Medical Data Sharing Among Cloud Service Providers via Blockchain; IEEE Access (vol. 5, 2017, pp. 14757-14767); (Year: 2017).*

Varsha Agarwal • Pooja Gupta; A Blockchain-enabled Authentication Scheme for IoT Cybersecurity Infrastructure; 2023 International Conference on Applied Intelligence and Sustainable Computing (ICAISC) (2023, pp. 1-7); (Year: 2023).*

* cited by examiner

*Primary Examiner* — Luu T Pham
*Assistant Examiner* — Chao Wang
(74) *Attorney, Agent, or Firm* — Thomas Horstemeyer, LLP

(57) ABSTRACT

Disclosed are various embodiments for providing blockchain-based threat intelligence. First, a computer determines that a request for a remedial action has been recorded to a blockchain by a smart contract. Then, the computer evaluates the request for the remedial action to determine the remedial action to be performed. Subsequently, the computer causes the remedial action to be performed by a security service.

20 Claims, 3 Drawing Sheets

BLOCKCHAIN-BASED THREAT INTELLIGENCE

BACKGROUND

New security threats are identified on a regular basis. As new threats are identified, their existence is often shared. This can include dissemination of the nature of the security threat, how to identify the security threat, and mitigation measures that can be used to address the threat. However, the speed of dissemination can often be slow as different organizations receive threat intelligence reports from different sources which may report with varying frequencies or delays.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for providing blockchain-based threat intelligence. Various embodiments of the present disclosure provide for the real-time or near real-time dissemination of cybersecurity threat intelligence using decentralized, peer-to-peer technologies, such as the blockchain. The use of a blockchain allows for threat intelligence to be publicly disseminated without reliance on any single threat intelligence provider to disseminate information about a cybersecurity threat at a particular time or within a particular period of time. Once a single organization posts a cyberthreat intelligence report to the blockchain, as well as information regarding whether mitigation measures have been deployed and the effectiveness of mitigation measures deployed, other organizations can view and consume this information in order to update their own information technology infrastructure in a timely manner.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
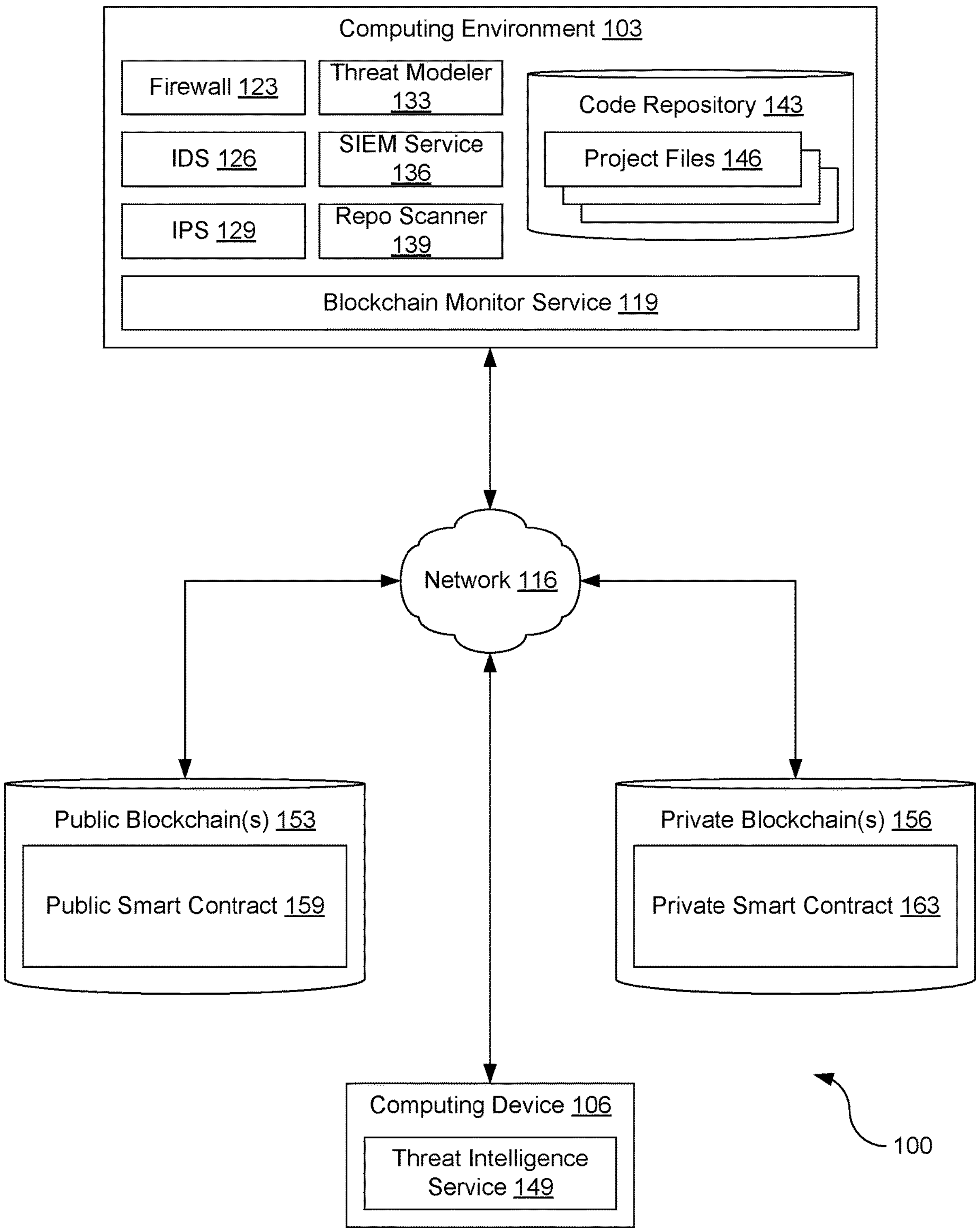
FIG. 1 is a drawing of a network environment according to various embodiments of the present disclosure.

As illustrated in FIG. 1, shown is a network environment 100 according to various embodiments. The network environment 100 can include a computing environment 103, a computing device 106, one or more public blockchains 109, and one or more private blockchains 113, which can be in data communication with each other via a network 116.

Although depicted separately for purposes of clarity, the computing device 106 could, in some implementations, be a component of the computing environment 103. This could occur, for example, when the computing environment 103 supports multiple or share tenancy. This could occur, for example, in the context of cloud computing providers which provide computational resources to multiple clients or customers. Examples of cloud computing providers which provide multiple or shared tenancy within the same computing environment 103 include AMAZON WEB SERVICES, MICROSOFT AZURE, GOOGLE CLOUD COMPUTE, among others.

The network 116 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 116 can also include a combination of two or more networks 116. Examples of networks 116 can include the Internet, intranets, extranets, virtual private networks (VPNs), and similar networks.

The computing environment 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 103 can employ a plurality of computing devices that can be arranged in one or more server banks or computer banks or other arrangements. Such computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103. The components executed on the computing environment 103 can include a blockchain monitor service 119 and one or more security services. Security services are application, programs, or services which can be executed by an organization to implement or enforce the security policies and procedures of the organization with respect to its computing assets and resources. Examples of security services can include a firewall 123, an intrusion detection system (IDS) 126, an intrusion prevention system (IPS) 129, a threat modeler 133, a security information and event management (SIEM) service 136, a repository scanner 139, and potentially other services.

The firewall 123 can be executed to monitor and control incoming and outgoing network connections based on one or more predefined rules. Firewalls 123 can include network firewalls which typically filter network traffic at the transport or internet layers of the Open Systems Interconnection (OSI) model or application firewalls that filter network at the application layer of the OSI model by controlling application programming interface (API) or system calls of an application or service. The firewall 123 can therefore be configured with one or more rules or polices in order to determine whether to grant or block access to a resource and can log successful or blocked connections.

The intrusion detection system (IDS) 126 can be executed to monitor network activity or systems activity for potential intrusions or security breaches. These intrusions or security breaches can be defined by various policies or rules. If a breach of a policy or a rule is detected, then a potential intrusion or security breach is identified. As an illustrative example, if access to a particular file, application, database, or computer, is restricted to a predefined set of users, then an unauthorized user or process accessing the file, application, database, or computer specified by the policy would constitute a security breach or intrusion. As another example, the IDS 126 could rely upon signatures for particular attacks. If application, user, or network activity is detected that matches The IDS 126 could log the access and/or report it.

The intrusion prevention system (IPS) 129 can be executed to respond to intrusions or potential intrusions that are detected by the IDS 126. The particular response can be defined by various policies or rules. For example, the IPS 129 could respond to a potential intrusion by updating a firewall 123 rule to block potentially malicious connections or network activity that has been detected. As another example, the IPS 129 could alter access rules to a file, application, database, or computer in response to the IDS 126 detecting unauthorized access of the resource. As another example, if the IDS 126 has detected a particular type of attack based on a signature, the IPS 129 could initiate a predefined corrective action for the attack to halt or mitigate the attack. Although described and depicted separately for clarity, it should be noted that, in some implementations, the IDS 126 and the IPS 129 can be combined as a single application or service.

The threat modeler 133 can be executed to model security threats for applications, services, computer systems or devices, or network systems or devices. The threat modeler 133 can, for example, maintain a list of threat models for individual computing or network resources (e.g., applications, services, computer systems or devices, network systems or devices, etc.). The threat model for an individual computing or network resource can list the types of threats that the computing or network resource is expected to face.

The security information and event management (SIEM) service 136 can be executed to accumulate and/or analyze information generated by other security services. For example, a SIEM service 136 could provide log collection, aggregation, and management facilities to allow users or applications to evaluate, review, or analyze logs generated by various security services. A SIEM service 136 could also identify correlations between various events that are identified in one or more logs. The IDS 126 and/or the IPS 129 could integrate with the SIEM service 136 to evaluate ongoing application, computer, network, or user activity in order to detect and/or prevent potential or ongoing security breaches or attacks.

The repository scanner 139 can be executed scan code repository 143 to determine whether project files 146 stored in the code repository 143 violate one or more security policies or have one or more known security vulnerabilities or issues. For example, the repository scanner 139 could scan project files 146 in the code repository 143 to determine whether any applications incorporate third-party libraries with known security vulnerabilities. As another example, the repository scanner 139 could scan project files 146 to determine if the source code of any applications or the object files of an application include any signatures that match a known security vulnerability. In some implementations, the IPS 129 could integrate with the repository scanner 139 to cause the code repository 143 to mitigate any identified security risks. In other implementations, the repository scanner 139 itself could cause the code repository 143 to mitigate any identified security risks.

The blockchain monitor service 119 can be executed to monitor transactions recorded to a public blockchain 109 or a private blockchain 113. This can allow for messages to be passed from a smart contract executing on a blockchain to individual applications such as individual security services. For example, the blockchain monitor service 119 could determine that a transaction recorded to a private blockchain 113 includes a policy update for a security service. The blockchain monitor service 119 could evaluate the transaction and pass the message to the security service, thereby causing the security service to update the policy it relies upon. The blockchain monitor service 119 could also record transaction to a blockchain in order to publish the state of individual security services or broadcast the result of changes to a security service.

The code repository 143 can represent a data store that stores project files 146 for various software projects. The code repository can both provide data storage services and space, as well as data management functions. This can include the ability to store or maintain multiple versions of individual project files 146, store or maintain revision histories for individual project files 146, authorize or deny permissions to access individual project files 146 to specific users, allow multiple users to edit project files 146 in parallel, synchronize changes made by multiple users to the same project file 146, etc. Examples of code repositories 143 can include GITHUB, SUBVERSION, the Concurrent Versioning System (CVS), etc.

The project files 146 can represent individual files associated with a project stored in the code repository 143. Project files 146 can include human readable source code files, binary object files (e.g., for dynamically linked libraries, modules, or plugins provided by third-parties), compiled executables generated from the project files 146, etc.

The computing device 106 can represent any computing device connected to the network 116. Although depicted separately, the computing device 106 could be a component of the computing environment 103, as previously described. The computing device 106 can be configured to execute a threat intelligence service 149. The threat intelligence service 149 can be configured to broadcast or otherwise publish to the public blockchain 109 information about newly detected security threats. This information can be obtained from a variety of sources, such as security researchers, industry groups that publish or release newly uncovered security threats or vulnerabilities, etc.

The public blockchain 153 and the private blockchain 156 can represent immutable, append only, eventually consistent distributed data stores formed from a plurality of nodes in a peer-to-peer network that maintain duplicate copies of data stored in the public blockchain 153 or the private blockchain 156. The nodes of the public blockchain 153 or the private blockchain 156 can use a variety of consensus protocols to coordinate the writing of data written to the public blockchain 153 or the private blockchain 156. In order to store data to the public blockchain 153 or the private blockchain 156, such as a record of a transaction of cryptocurrency coins or tokens between wallet addresses, users can pay cryptocurrency coins or tokens to one or more of the nodes of the public blockchain 153 or the private blockchain 156.

As previously discussed, blockchains may be public or private. A public blockchain 153 is a blockchain that is accessible and available to anyone who operates a node, client, or other application configured to connect to or participate in the public blockchain 153. A private blockchain 156, sometimes referred to as a permissioned blockchain 156, is a blockchain where participation is limited to authorized or permitted participants. A private blockchain 156 can be used in situations where the advantages of an immutable, append only, eventually consistent distributed data stores formed from a plurality of nodes in a peer-to-peer network that maintain duplicate copies of data is desired, but public or unrestricted access to the data is not desired. Examples of public blockchain 153 include the BITCOIN network, the ETHEREUM network, the SOLANA network, etc. Examples of a private blockchain 156 include sidechains to the BITCOIN network or ETHEREUM network, as well as HYPERLEDGER or similar systems.

In some implementations, smart contracts can be stored on the blockchain, such as a public smart contract 159 on the public blockchain 153 and a private smart contract 163 on the private blockchain 156. A smart contract can represent executable computer code that can be executed by a node of the blockchain. In many implementations, the smart contract can expose one or more functions that can be called by any user or by a limited set of users. To execute one or more functions of a smart contract, an application can submit a request to a node of the blockchain to execute the function. The node can then execute the function and store the result to the blockchain. Nodes may charge fees in the form of cryptocurrency coins or tokens to execute a function and store the output, with more complicated or extensive functions requiring larger fees. An example of this implementation is the ETHEREUM blockchain, where users can pay fees, referred to as "gas," in order to have a node of the ETHEREUM blockchain execute the function and store the result to the ETHEREUM blockchain. Additionally, the more "gas" a user pays, the more quickly the function will be executed and its results committed to the blockchain.

Figure 2:
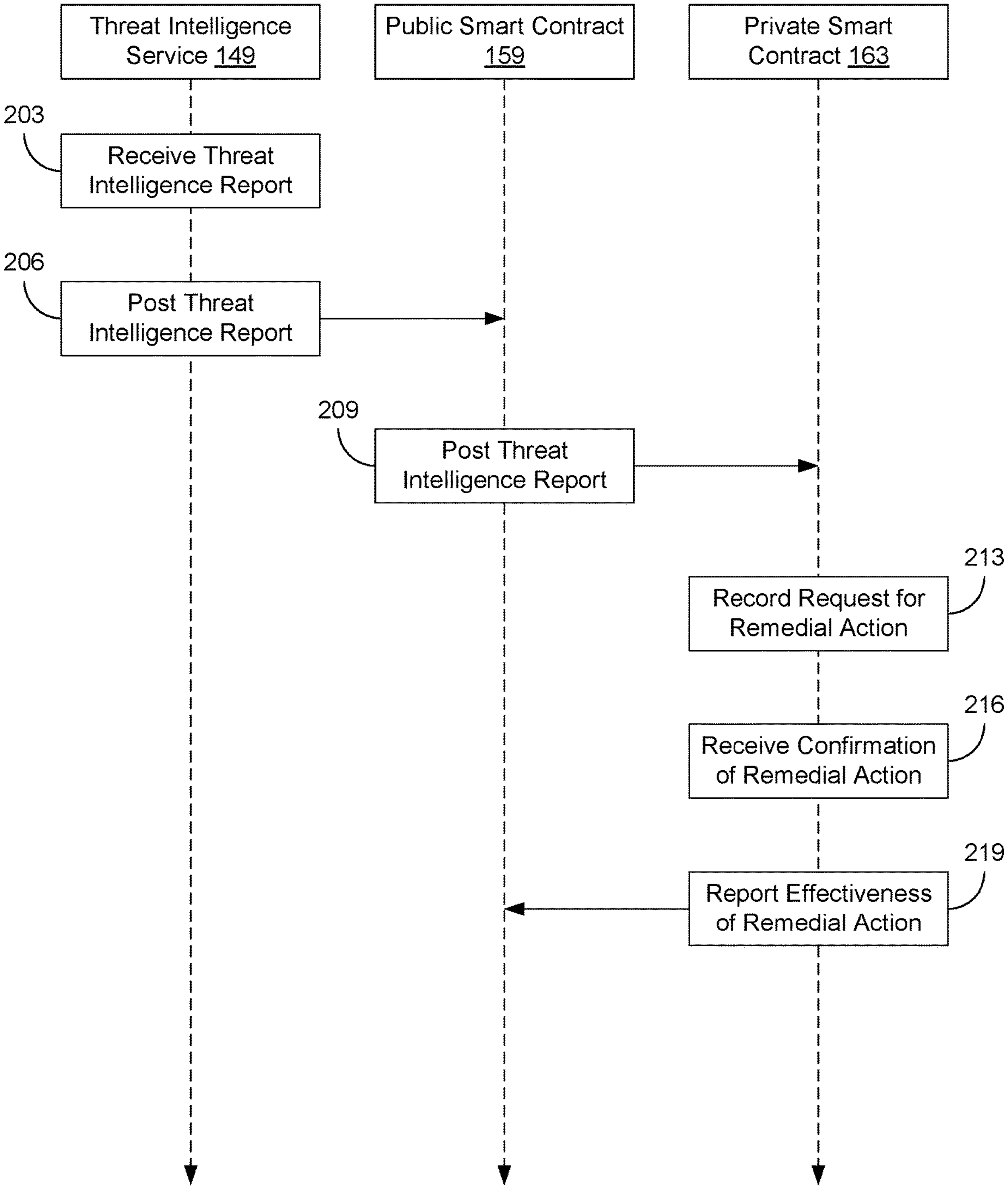
FIG. 2 is a sequence diagram illustrating one example of interactions between components of the network environment of FIG. 1 according to various embodiments of the present disclosure.

Referring next to FIG. 2, shown is a sequence diagram that provides one example of the interactions between the threat intelligence service 149, a public smart contract 159, and a private smart contract 163. The sequence diagram of FIG. 2 provides merely an example of the many different types of functional arrangements that can be employed to implement the operations of the depicted portion of the threat intelligence service 149, the public smart contract 159, and the private smart contract 163. As an alternative, the sequence diagram of FIG. 2 can be viewed as depicting an example of elements of a method implemented within the network environment 100.

Beginning with block 203, the threat intelligence service 149 can receive a threat intelligence report. Threat intelligence reports could be received from a variety of sources, such as security researchers, subscription services that publish newly discovered threats at periodic intervals, etc. The threat intelligence report can include one or more items of data related to a particular threat. For example, in a simple threat, the threat intelligence report could include a single Common Vulnerability and Exposure (CVE), Common Weakness Numeration (CWE), or Common Attack Pattern Enumeration and Classification (CAPEC) reference, possibly in combination with a Common Vulnerability Scoring System (CVSS) score to indicate the severity of the threat. However, more complicated threats, such as those where multiple vulnerabilities are chained together to exploit a system, could be represented by a threat intelligence report that includes multiple CVE, CWE, and/or CAPEC references. Additional information could also be included in a threat intelligence report as required by various embodiments of the present disclosure.

Then, at block 206, the threat intelligence service 149 can post the threat intelligence report to the public blockchain 153. This can be done by calling or invoking a function provided by a public smart contract 159. The threat intelligence service 149 could include the threat intelligence report as an argument to the function of the public smart contract 159, thereby cause the public smart contract 159 to record a transaction to the public blockchain 153 that includes the threat intelligence report.

Next, at block 209, the public smart contract 159 can post the threat intelligence report to one or more private blockchains 156. For example, the public smart contract 159 can invoke a function provided by a private smart contract 163. The identities of the private smart contracts 163 could be predefined within the public smart contract 159 in some embodiments in order to allow the public smart contract 159 to call or invoke the private smart contract(s) 163 on the private blockchain(s) 156. The public smart contract 159 could include the threat intelligence report as an argument to the function of the private smart contract 163, thereby causing the private smart contract 163 to record a transaction to the private blockchain 156 that includes the threat intelligence report at block 213.

Proceeding to block 213, the private smart contract 163 can record a transaction to the private blockchain 156 to cause a remedial action to be performed by a security service. Accordingly, the transaction written to the private blockchain 156 can act as a request to the security service to perform a remedial action based at least in part on the content of the threat intelligence report. The transaction recorded to the private blockchain 156 can include information such as the identity of the private smart contract 163, information included in the threat intelligence report (e.g., CVE, CWE, and/or CAPEC references as well as other data), and potentially other information. By recording this information as a transaction on the private blockchain 156, off-chain applications or services (e.g., the blockchain monitor service 119) can monitor the private blockchain 156 to determine when various events or triggers have occurred. For example, in response to information from the threat intelligence report being recorded as a transaction on the private blockchain 156, the blockchain monitor service 119 could detect that the information from the threat intelligence report has been recorded to the private blockchain 156 and cause a security service to perform one or more actions based at least in part on the information within the threat intelligence report. This process is described in further detail in the sequence diagram of FIG. 3.

Moving on to block 216, the private smart contract 163 can receive a confirmation that a remedial action has been taken or performed by a security service. For example, the blockchain monitor service 119 or a security service could call or otherwise invoke a function provided by the private smart contract 163. Arguments to the function could include information such as the identifier for the threat intelligence report, the type of remedial action that was used (e.g., an updated firewall ruleset, an updated IDS signature, an updated IPS mitigation rule or policy, a repository scan for vulnerable libraries or components, etc.), and/or whether or not the remedial action was successful (e.g., the SIEM service 136 or the IDS 126 failed to detect any attacks matching a signature in the threat intelligence report, vulnerable components were successfully updated or removed from the appropriate project files 146, vulnerable components were successfully blocked from being committed to the code repository 143, etc.).

Subsequently, at block 219, the private smart contract 163 can report the effectiveness of the remedial action. For example, the private smart contract 163 can call or invoke a function provided by the public smart contract 159. The private smart contract 163 could provide as arguments to the public smart contract 159 information such as the identifier for the threat intelligence report, the type of remedial action that was used (e.g., an updated firewall ruleset, an updated IDS signature, an updated IPS mitigation rule or policy, a repository scan for vulnerable libraries or components, etc.), and/or whether or not the remedial action was successful. In response to the function call, the public smart contract 159 could then record a transaction to the public blockchain 153. The transaction recorded could include information such as the identifier of the threat intelligence report, the type of remedial action that was used, the identity of the organization that implemented the remedial action, and/or whether or not the remedial action was successful. The identity of the organization that implemented the remedial action could be determined, for example, based at least in part on the identifier of the private smart contract 163 (e.g., where each organization has its own private smart contracts 163, the wallet address for the private smart contract 163 could be used to identify the organization) or based at least in part on an argument provided to the function of the public smart contract 159 by the private smart contract 163.

Figure 3:
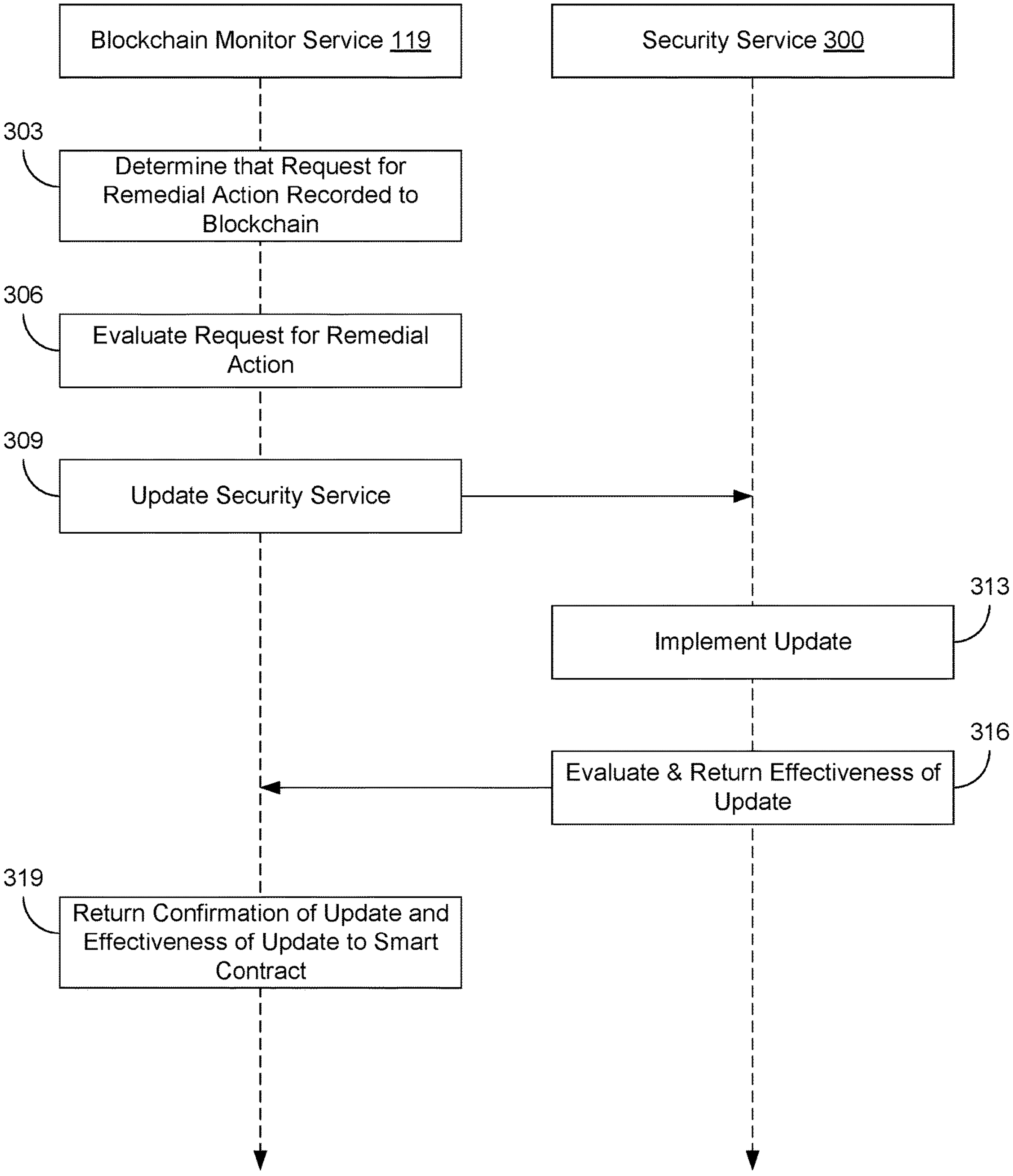
FIG. 3 is a sequence diagram illustrating one example of interactions between components of the network environment of FIG. 1 according to various embodiments of the present disclosure.

Referring next to FIG. 3, shown is a sequence diagram that provides one example of the operation of the interactions between the blockchain monitor service 119 and a security service 300 (e.g., the firewall 123, the IDS 126, the IPS 129, the threat modeler 133, the SIEM service 136, the repository scanner 139, etc.). The sequence diagram of FIG. 3 provides merely an example of the many different types of functional arrangements that can be employed to implement the depicted portions of blockchain monitor service 119 and the security service 300. As an alternative, the sequence diagram of FIG. 3 can be viewed as depicting an example of elements of a method implemented within the network environment 100.

Beginning with block 303, the blockchain monitor service 119 can determine that a request to perform a remedial action has been recorded in a transaction written or committed to a blockchain, such as a private blockchain 156. This could occur, for example, subsequent to block 213 in FIG. 2. The blockchain monitor service 119 could, for example, monitor transactions recorded to a copy of the private blockchain 156 executed by a node of the private blockchain 156 that is also executing blockchain monitor service 119. When a transaction containing information recorded by a private smart contract 163 related to threat intelligence report is detected, then the blockchain monitor service 119 could determine that a new request to perform a remedial action has been submitted to the private blockchain 156.

Then, at block 306, the blockchain monitor service 119 can evaluate the request for the remedial action to determine which security service 300 needs to be updated, configured, or reconfigured to address or redress the security threat specified by the threat intelligence report. For example, in some implementations, individual private smart contracts 163 could be associated with specific security services 300. For example, a first private smart contract 163 could be associated with the firewall 123, a second private smart contract 163 could be associated with the IDS 126, a third private smart contract 163 could be associated with the IPS 129, a fourth private smart contract 163 could be associated with the threat modeler 133, a fifth private smart contract 163 could be associated with the SIEM service 136, a sixth private smart contract 163 could be associated with the repository scanner 139, etc. In these implementations, the blockchain monitor service 119 could evaluate the transaction written or recorded to the private blockchain 156 to determine which private smart contract 163 wrote or recorded the transaction (e.g., by determining the wallet address of the private smart contract 163 that wrote or recorded the transaction). The blockchain monitor service 119 could then determine which security service 300 is to be updated based at least in part on the identity of the private smart contract 163.

Next, at block 309, the blockchain monitor service 119 can cause the security service 300 identified at block 306 to be updated based at least in part on the contents of the request to perform the remedial action that were included in the transaction recorded or written to the blockchain. For example, if the private smart contract 163 were associated with the firewall 123, then the blockchain monitor service 119 could provide one or more attack signatures or firewall rules included in the request for the remedial action to the firewall 123. As another example, if the private smart contract 163 were associated with the IDS 126, then the blockchain monitor service 119 could provide one or more attack signatures included in the request for the remedial action to the IDS 126. As another example, if the private smart contract 163 were associated with the IPS 129, then the blockchain monitor service 119 could provide one or more rules or policies, included in the request for the remedial action, for negating or mitigating the threat to the IPS 129. As another example, if the private smart contract 163 were associated with the threat modeler 133, then the blockchain monitor service 119 could provide one or more threat references (e.g., CVE, CWE, or CAPEC references) included in the request for the remedial action to the threat modeler 133 for use in modeling the threats faced by various applications or services in the future. As another example, if the private smart contract 163 were associated with the SIEM service 136, then the blockchain monitor service 119 could provide one or more attack signatures included in the request for the remedial action to the SIEM service 136 to enable the SIEM service 136 to detect or identify the threat from an analysis of logs. As another example, if the private smart contract 163 were associated with the repository scanner 139, then the blockchain monitor service 119 could provide threat references (e.g., CVE, CWE, or CAPEC references) in the request for the remedial action to the repository scanner 139 to enable the repository scanner 139 to identify threats included in the project files 146 of various software projects.

Proceeding to block 313, the security service 300 can implement the updates provided by the blockchain monitor service 119. For example, a firewall 123 could update its firewall ruleset to incorporate new signatures or rules that were included in the request for the remedial action in order to block network traffic related to the security threat. As another example, the IDS 126 could update its database or list of attack signatures with the signatures that were included in the request for the remedial action in order to better detect the security threat. As another example, the IPS 129 could update its rules or policies with those rules or policies that were included in the request for the remedial action in order to better respond to the security threat in the event it is detected or identified. As another example, the threat modeler 133 could updates its threat model to include those threat references included in the request for the remedial action in order to better or more accurately model security threats faced by various software applications, services, or other computing resources. As another example, the SIEM service 136 could update its database of attack or threat signatures to include the signatures that were included in the request for the remedial action in order to better detect the security threat based on analysis of various logs or events. As another example, the repository scanner 139 could be configured to block or prevent files or software libraries from being committed or uploaded to the code repository 143 in order to prevent security threats or vulnerabilities from being introduced into project files 146. Similarly, the repository scanner 139 could be configured to execute a scan to identify project files 146 that contain a security vulnerability identified in the threat intelligence report (e.g., because a project file 146 references or incorporates a vulnerable version of a software library or component).

Moving to block 316, the security service 300 can determine or evaluate the effectiveness of the update or updates that were implemented at block 313. For example, the security service 300 could determine whether the updates were successfully implemented (e.g., the firewall 123 successfully loaded new rules, the IDS 126 successfully updated its signature database or detected a security breach or attempted security breach using the new signatures, the IPS 129 successfully updated its policy or rules database or successfully implemented a new policy or rule to mitigate a detected security breach or attempted security breach, the threat modeler 133 successfully included the new threat in its security models, the SIEM service 136 successfully updated its database of signatures and/or successfully detected a security threat using the new signatures, the repository scanner 139 successfully detected one or more project files 146 with vulnerable components or successfully updated the configuration of the code repository 143 to block the upload of vulnerable components or libraries, etc. These results could then be returned to the blockchain monitor service 119, which could report the results to the private smart contract 163.

Subsequently, at block 319, the blockchain monitor service 119 can return a confirmation of the update to the private smart contract 163 and the effectiveness of the update to the private smart contract 163. For example, the blockchain monitor service 119 could call or invoke a function provided by the private smart contract 163 and provide a confirmation and an indication of the effectiveness as arguments. This could occur, for example, prior to block 216 of FIG. 2. It should be noted, however, that in some instances this step could be performed by the security service 300 instead of by the blockchain monitor service 119.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random-access portion of the memory and run by the processor, source code that can be expressed in proper format such as object code that is capable of being loaded into a random-access portion of the memory and executed by the processor, or source code that can be interpreted by another executable program to generate instructions in a random-access portion of the memory to be executed by the processor. An executable program can be stored in any portion or component of the memory, including random-access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random-access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random-access memory (SRAM), dynamic random-access memory (DRAM), or magnetic random-access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random-access memory (RAM) including static random-access memory (SRAM) and dynamic random-access memory (DRAM), or magnetic random-access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:

a computing device comprising a processor and a memory; and machine-readable instructions stored in the memory that, when executed by the processor, cause the computing device to at least:

determine that a request for a remedial action has been recorded to a blockchain by a first smart contract, wherein the request comprises at least one of a rule update, a policy update, an attack signature, or a threat reference and wherein the first smart contract recorded the request for the remedial action to the blockchain in response to receipt of a threat intelligence report from a second smart contract;

identify the first smart contract that recorded the request for the remedial action;

identify a security service based at least in part on an identity of the first smart contract;

determine the remedial action to be performed based at least in part on the request for the remedial action and the identity of the first smart contract; and cause the remedial action to be performed by the security service.

2. The system of claim 1, wherein the machine-readable instructions further cause the computing device to at least:

receive, from the security service, a confirmation that the remedial action has been performed; and call a function provided by the first smart contract to cause the first smart contract to record the confirmation of the remedial action to the blockchain.

3. The system of claim 1, wherein the machine-readable instructions further cause the computing device to at least:

receive, from the security service, an indication of an effectiveness of the remedial action; and call a function provided by the first smart contract to cause the first smart contract to record the effectiveness of the remedial action to the blockchain.

4. The system of claim 1, wherein the security service comprises at least one of a firewall, an intrusion detection system (IDS), an intrusion prevention system (IPS), a threat modeler, a system information and event management (SIEM) service, or a repository scanner.

5. The system of claim 1, wherein the blockchain is a private blockchain.

6. The system of claim 1, wherein the first smart contract is a private smart contract.

7. The system of claim 1, wherein the machine-readable instructions that cause the computing device to cause the remedial action to be performed by the security service cause the computing device to at least provide the security service with the at least one of the rule update, the policy update, the attack signature, or the threat reference.

8. A method, comprising:
determining that a request for a remedial action has been recorded to a blockchain by a first smart contract, wherein the request comprises at least one of a rule update, a policy update, an attack signature, or a threat reference and wherein the first smart contract recorded the request for the remedial action to the blockchain in response to receipt of a threat intelligence report from a second smart contract;
identifying the first smart contract that recorded the request for the remedial action;
identifying a security service based at least in part on an identity of the first smart contract;
determining the remedial action to be performed based at least in part on the request for the remedial action and the identity of the first smart contract; and
causing the remedial action to be performed by the security service.

9. The method of claim 8, further comprising:
receiving, from the security service, a confirmation that the remedial action has been performed; and
calling a function provided by the first smart contract to cause the first smart contract to record the confirmation of the remedial action to the blockchain.

10. The method of claim 8, further comprising:
receiving, from the security service, an indication of an effectiveness of the remedial action; and
calling a function provided by the first smart contract to cause the first smart contract to record the effectiveness of the remedial action to the blockchain.

11. The method of claim 8, wherein the security service comprises at least one of a firewall, an intrusion detection system (IDS), an intrusion prevention system (IPS), a threat modeler, a system information and event management (SIEM) service, or a repository scanner.

12. The method of claim 8, wherein the blockchain is a private blockchain.

13. The method of claim 8, wherein the first smart contract is a private smart contract.

14. The method of claim 8, wherein causing the remedial action to be performed by the security service comprises providing the security service with the at least one of the rule update, the policy update, the attack signature, or the threat reference.

15. A non-transitory, computer-readable medium, comprising machine-readable instructions that, when executed by a processor of a computing device, cause the computing device to at least:
determine that a request for a remedial action has been recorded to a blockchain by a first smart contract, wherein the request comprises at least one of a rule update, a policy update, an attack signature, or a threat reference and wherein the first smart contract recorded the request for the remedial action to the blockchain in response to receipt of a threat intelligence report from a second smart contract;
identify the first smart contract that recorded the request for the remedial action:
identify a security service based at least in part on an identity of the first smart contract;
determine the remedial action to be performed based at least in part on the request for the remedial action and the identity of the first smart contract; and
cause the remedial action to be performed by the security service.

16. The non-transitory, computer-readable medium of claim 15, wherein the machine-readable instructions further cause the computing device to at least:
receive, from the security service, a confirmation that the remedial action has been performed; and
call a function provided by the first smart contract to cause the first smart contract to record the confirmation of the remedial action to the blockchain.

17. The non-transitory, computer-readable medium of claim 15, wherein the machine-readable instructions further cause the computing device to at least:
receive, from the security service, an indication of an effectiveness of the remedial action; and
call a function provided by the first smart contract to cause the first smart contract to record the effectiveness of the remedial action to the blockchain.

18. The non-transitory, computer-readable medium of claim 15, wherein the blockchain is a private blockchain.

19. The non-transitory, computer-readable medium of claim 15, wherein the first smart contract is a private smart contract.

20. The non-transitory, computer-readable medium of claim 15, wherein the machine-readable instructions that cause the computing device to cause the remedial action to be performed by the security service cause the computing device to at least provide the security service with the at least one of the rule update, the policy update, the attack signature, or the threat reference.

* * * * *